(12) United States Patent
Boeve et al.

(10) Patent No.: US 8,069,004 B2
(45) Date of Patent: Nov. 29, 2011

(54) SYSTEM COMPRISING A GENERATING DEVICE AND A COMPARING DEVICE

(75) Inventors: Hans Boeve, Hechtel-Eksel (BE);
Teunis Jan Ikkink, Geldrop (NL);
Victor Van Acht, Waalre (NL)

(73) Assignee: NXP B.V., Eindhoven (NL)

( * ) Notice: Subject to any disclaimer, the term of this patent is extended or adjusted under 35 U.S.C. 154(b) by 422 days.

(21) Appl. No.: 11/914,653

(22) PCT Filed: May 9, 2006

(86) PCT No.: PCT/IB2006/051454
§ 371 (c)(1),
(2), (4) Date: Nov. 16, 2007

(87) PCT Pub. No.: WO2006/126117
PCT Pub. Date: Nov. 30, 2006

(65) Prior Publication Data
US 2008/0208518 A1    Aug. 28, 2008

(30) Foreign Application Priority Data
May 24, 2005 (EP) .................................... 05104383

(51) Int. Cl.
*G06F 15/00* (2006.01)

(52) U.S. Cl. ........ 702/150; 702/151; 702/152; 700/192; 700/254; 318/587; 318/649

(58) Field of Classification Search .......... 702/150–152; 700/192, 245; 318/587, 649
See application file for complete search history.

(56) References Cited

U.S. PATENT DOCUMENTS

| | | | |
|---|---|---|---|
| 3,739,251 A | 6/1973 | Masuzawa | |
| 4,562,391 A | 12/1985 | Inoue | |
| 5,617,515 A | 4/1997 | MacLaren et al. | |
| 5,922,039 A | 7/1999 | Welch et al. | |
| 6,925,410 B2 * | 8/2005 | Narayanan | 702/150 |
| 2002/0165648 A1 | 11/2002 | Zeitler | |
| 2004/0172838 A1 * | 9/2004 | Satoh et al. | 33/316 |
| 2006/0167618 A1 * | 7/2006 | Werback | 701/120 |

FOREIGN PATENT DOCUMENTS
EP 0189248 A2 7/1986

\* cited by examiner

*Primary Examiner* — Sujoy Kundu

(57) ABSTRACT

Systems comprising generating devices comprising sensors for generating sensor signals representing orientations of the generating devices are provided with comparing devices comprising comparators for comparing the sensor signals with reference signals for interpreting the orientations, to increase the number of possible applications. The generating devices and the comparing devices may form parts of one apparatus or of different apparatuses and then communicate wiredly or wirelessly via radio or infrared. Reference sensors for generating the reference signals and/or reference memories for storing the reference signals may be located in the comparing devices and/or in sources and then communicate wiredly or wirelessly via radio or infrared. Further comparators in the comparing devices may introduce adjustable sensitivities.

17 Claims, 5 Drawing Sheets

SYSTEM COMPRISING A GENERATING DEVICE AND A COMPARING DEVICE

The invention relates to a system comprising a generating device and a comparing device, and also relates to a generating device, to a comparing device, to a source, to a method, to a processor program product, and to a data carrier.

Examples of such a generating device are devices comprising orientation sensors, and examples of such a system are environments of such devices.

A prior art system is known from US 2004/0172838, which discloses a system comprising a device for measuring a directional of a body. Thereto, the device comprises magnetic sensors and tilt sensors.

The known system is disadvantageous, inter alia, owing to the fact that it offers a relatively small number of possible applications. It is designed to inform a user.

It is an object of the invention, inter alia, to provide a system that offers more possible applications.

Further objects of the invention are, inter alia, to provide a generating device, a comparing device, a source, a method, a processor program product, and a data carrier that offer more possible applications.

The system according to the invention comprises:

a generating device comprising a sensor for generating a sensor signal representing an orientation of at least a part of the generating device, and a comparing device comprising a comparator for comparing the sensor signal with a reference signal for interpreting the orientation.

By introducing, in addition to a generating device comprising a sensor for generating a sensor signal representing an orientation of at least a part of the generating device, a comparing device comprising a comparator for comparing the sensor signal with a reference signal for interpreting the orientation, the orientation of at least a part of the generating device is interpreted. As a result, the sensor signal originating from the generating device is not only used to inform a user, but is now also interpreted in view of the reference signal. This increases the number of possible applications to a large extent.

The system according to the invention is further advantageous, inter alia, in that an increased number of possible applications will improve a user's experience and existence in many ways. The sensor for example comprises an orientation sensor such as a compass for example based on a magnetic sensor and a tilt sensor without excluding other sensors.

An embodiment of the system according to the invention is defined by the generating device and the comparing device being parts of one apparatus. By combining both devices into one apparatus, this one apparatus is able to generate an orientation of at least a part of the apparatus as well as to interpret this orientation.

An embodiment of the system according to the invention is defined by the generating device and the comparing device being different apparatuses, the generating device further comprising a transmitter for transmitting the sensor signal to the comparing device, which comparing device further comprises a receiver for receiving the sensor signal. By locating both devices into different apparatuses, a generating apparatus is able to generate an orientation of at least a part of the generating apparatus and a comparing apparatus is able to interpret this orientation closely to the generating apparatus or far away from the generating apparatus. The transmitter and the receiver may communicate wiredly or wirelessly via radio or infrared, without excluding other communications.

An embodiment of the system according to the invention is defined by the sensor signal comprising a first sensor signal representing a first orientation and/or a second sensor signal representing a second orientation and/or a third sensor signal representing a third orientation. The first and second and third orientations may be frame orientations such as X-axes and Y-axes and Z-axes or rolling and pitching and yawing or may be angle orientations without excluding other orientations. The sensor signal may comprise x-coordinates, y-coordinates and z-coordinates or may comprise rolling values, pitching values and yawing values or may comprise angle values, without excluding further signals.

An embodiment of the system according to the invention is defined by the comparing device further comprising a reference sensor for generating the reference signal. This comparing device is relatively independent from an outer world. The reference sensor may depend on an outer world or not. In case the generating device and the comparing device form parts of one apparatus, the reference sensor is to be located at a reference position in the comparing device to avoid that an orientation of at least a part of the generating device has influence on the reference sensor.

An embodiment of the system according to the invention is defined by the comparing device further comprising a reference memory for storing the reference signal. This reference memory prevents that the reference sensor is to be used each time an orientation is to be interpreted, which reduces a power consumption of the system.

An embodiment of the system according to the invention is defined by the comparing device further comprising a further receiver for receiving the reference signal from a source, which source comprises a further transmitter for transmitting the reference signal to the comparing device. This comparing device is not independent from an outer world but needs to get the reference signal from the outer world. The source may supply more than one comparing device to increase the efficiency of the source. The further transmitter and the further receiver may communicate wiredly or wirelessly via radio or infrared, without excluding other communications.

An embodiment of the system according to the invention is defined by the comparing device further comprising a reference memory for storing the reference signal. This reference memory prevents that the source is to be used each time an orientation is to be interpreted, which reduces a power consumption of the system.

An embodiment of the system according to the invention is defined by further comprising the source. This system comprising the generating device and the comparing device and the source is a flexible system and can be used at any location.

An embodiment of the system according to the invention is defined by the source comprising a reference sensor for generating the reference signal. This source is relatively independent from an outer world. The reference sensor may depend on an outer world or not.

An embodiment of the system according to the invention is defined by the source comprising a reference memory for storing the reference signal originating from a reference sensor. This source is not independent from an outer world but needs to get the reference signal from the outer world. The reference sensor may supply more than one source to increase the efficiency of the reference sensor. The reference signal may be communicated wiredly or wirelessly via radio or infrared, without excluding other communications.

An embodiment of the system according to the invention is defined by the comparing device further comprising a further comparator for comparing a comparison result originating from the comparator with a threshold value and for in response to a further comparison result generating a result signal. This further comparator introduces an adjustable sensitivity. The result signal might start (re)actions, such as (de)activations without excluding other (re)actions.

An embodiment of the system according to the invention is defined by further comprising:

a further generating device comprising a further sensor for generating a further sensor signal representing a further orientation of at least a part of the further generating device, which further sensor signal is to be compared with a further reference signal for interpreting the further orientation.

The comparing of the further sensor signal with the further reference signal for interpreting the further orientation may be done via the comparing device or via a further comparing device comprising a yet further comparator for comparing the further sensor signal with the further reference signal for interpreting the further orientation. The further reference signal may correspond with the reference signal or not.

Embodiments of the generating device according to the invention and of the comparing device according to the invention and of the source according to the invention and of the method according to the invention and of the processor program product according to the invention and of the data carrier according to the invention correspond with the embodiments of the system according to the invention.

The invention is based upon an insight, inter alia, that a generating device offers a relatively small number of possible applications, and is based upon a basic idea, inter alia, that a comparing device is to be introduced for interpreting an orientation of at least a part of the generating device.

The invention solves the problem, inter alia, to provide a system that offers more possible applications, and is further advantageous, inter alia, in that an increased number of possible applications will improve a user's experience and existence in many ways.

These and other aspects of the invention will be apparent from and elucidated with reference to the embodiments(s) described hereinafter.

In the drawings:

FIG. 1 shows diagrammatically a first embodiment of a system according to the invention comprising a generating device according to the invention and a comparing device according to the invention and a further generating device according to the invention, FIG. 2 shows diagrammatically a second embodiment of a system according to the invention comprising a generating device according to the invention and a comparing device according to the invention, FIG. 3 shows diagrammatically a third embodiment of a system according to the invention comprising a generating device according to the invention and a comparing device according to the invention, FIG. 4 shows diagrammatically a fourth embodiment of a system according to the invention comprising a generating device according to the invention and a comparing device according to the invention and a source according to the invention, FIG. 5 shows a reference frame defined by a reference signal and a rotated frame defined by a sensor signal and a corresponding rotation made anti clockwise, and FIG. 6 shows a reference frame defined by a reference signal and a rotated frame defined by a sensor signal and a corresponding rotation made clockwise.

The system 1 according to the invention shown in FIG. 1 comprises one apparatus 4 comprising a generating device 2 according to the invention with a sensor 21 for generating a sensor signal representing an orientation of at least a part of the generating device 2 and a further generating device 6 according to the invention with a further sensor 61 for generating a further sensor signal representing a further orientation of at least a part of the further generating device 6 and a comparing device 3 according to the invention with a comparator 31 for comparing the sensor signal with a reference signal for interpreting the orientation and with an other comparator 37 for comparing the further sensor signal with a further reference signal for interpreting the further orientation. Alternatively, one comparator 31 or 37 may be used for making the comparisons for example multiplexed in time. Both reference signals originate from a reference sensor 33. Alternatively, they may originate from different reference sensors. These reference signals may be identical to each other or not. Outputs of the comparators 31 and 37 are coupled to a processor 38 which is further coupled to an interface 39.

The apparatus 4 for example is a car, with the generating device 2 for example being a rear view mirror and with the further generating device 6 for example being a steering wheel and with the comparing device 3 for example being located elsewhere in the car. The sensors 21 and 61 and the reference sensor 33 for example each comprise one or more magnetic sensors and one or more tilt sensors. The comparators 31 and 37 compare the sensor signals with the reference signals and provide the processor 38 with the comparison results. As a result, the processor 38 can estimate which driver of a known group of drivers is going to drive the car and can, in response to an estimation, control the interface 39 for example comprising a voice system to use the proper name of the driver when speaking to this driver. Thereto, this known group of drivers should have entered their names into the voice system in the past, and these names and the comparison results should have been linked in the past and/or links between these names and the comparison results should have been stored in the past.

Alternatively, the comparator 31 (or 37) compares the sensor signal from the sensor 21 in the rear view mirror (or from the sensor 61 in the steering wheel) with the reference signal and provides the processor 38 with the comparison result. As a result, the processor 38 can estimate the size of the driver that is going to drive the car and can, in response to an estimation, control the interface 39 for example comprising a controller for controlling a motorized orientation of the steering wheel (or a motorized orientation of the rear view mirror) to adjust it.

The system 1 according to the invention shown in FIG. 2 comprises one apparatus 4 comprising a generating device 2 according to the invention with a sensor 21 for generating a sensor signal representing an orientation of at least a part of the generating device 2 and a comparing device 3 according to the invention with a comparator 31 for comparing the sensor signal with a reference signal for interpreting the orientation. This reference signal originates from a reference memory 34 for storing the reference signal originating from a reference sensor 33. An output of the comparator 31 is coupled to a first input of a further comparator 36 further comprising a second input coupled to a processor 38 for receiving one or more threshold values and an output coupled to an input of the processor 38 which is further coupled to an interface 39 and to control inputs of the reference memory 34 and of the reference sensor 33. The further comparator 36 compares a comparison result originating from the comparator 31 with the one or more threshold values and, in response to a further comparison result, generates a result signal destined for the processor 38.

This reference memory 34 prevents that the reference sensor 33 is to be used each time an orientation is to be interpreted, which reduces a power consumption of the system 1. This further comparator 36 introduces an adjustable sensitivity. This sensitivity can be adjusted by adjusting the one or more threshold values and/or be selecting one or more threshold values to be used.

The system 1 according to the invention shown in FIG. 3 corresponds with the system 1 shown in FIG. 2, apart from the fact that the generating device 2 and the comparing device 3 now form part of different apparatuses not shown. In addition, the generating device 2 is provided with a transmitter 22 and the comparing device 3 is provided with a receiver 32 for exchanging the sensor signal. The transmitter 22 and the receiver 32 may communicate wiredly or wirelessly. The communication 7 comprises radio such as BLUETOOTH, GSM, GPRS, UMTS etc. or infrared, without excluding other communications.

The generating device 2 for example is a car and the comparing device 3 for example is a tunnel. The sensor 21 and the reference sensor 33 for example each comprise one or more magnetic sensors and one or more tilt sensors. The comparator 31 compares the sensor signal with the reference signal and provides the processor 38 with the comparison result. As a result, the processor 38 can estimate whether the car is having an accident in the tunnel and can, in response to an estimation, control the interface 39 for example comprising an alarm system for indicating to other drivers at the entrance of the tunnel that problems have occurred.

Instead of being provided with the reference sensor 33 all the time, this reference sensor 33 may be avoided and the reference memory 34 only needs to receive the reference signal only once, for example through a calibration of the tunnel, owing to the fact that generally a tunnel does not move. In case of the comparing device 3 being a moving device, either the reference sensor 33 should be present all the time or the moving device is to be calibrated regularly.

The system 1 according to the invention shown in FIG. 4 corresponds with the system 1 shown in FIG. 3, apart from the fact that the comparing device 3 does no longer comprise the reference sensor 33. Instead of that, the system 1 is provided with a source comprising a further transmitter 51 for transmitting the reference signal to the comparing device 3 further comprising a further receiver 35 for receiving the reference signal from the source 5. The source 5 further comprises a reference sensor 52 for generating the reference signal and a reference memory 53 coupled to the reference sensor 52 and to the further transmitter 51 for storing the reference signal originating from the reference sensor 52. The further transmitter 52 and the further receiver 35 may communicate wiredly or wirelessly. The communication 8 comprises radio such as BLUETOOTH, GSM, GPRS, UMTS etc. or infrared, without excluding other communications.

The generating device 2 for example is a trailer and the comparing device 3 for example is a car pulling the trailer and the source 5 for example is a tunnel. The sensor 21 and the reference sensor 52 for example each comprise one or more magnetic sensors and one or more tilt sensors. The comparator 31 compares the sensor signal with the reference signal and provides the processor 38 with the comparison result. As a result, the processor 38 can estimate whether the trailer behind the car is experiencing trouble in the tunnel and can, in response to an estimation, control the interface 39 for example comprising an alarm system to alert the driver of the car.

Instead of being provided with the reference sensor 52 all the time, this reference sensor 52 may be avoided and the reference memory 53 only needs to receive the reference signal only once, for example through a calibration of the tunnel, owing to the fact that generally a tunnel does not move. The reference memory 34 in the comparing device 3 may be present to avoid that the reference signal is to be transmitted too often. Alternatively, the reference memory 34 in the comparing device may be avoided in case the reference signal is transmitted sufficiently regularly.

Many other applications are possible without departing from the scope of this invention. To monitor elderly people, generating devices may be located into shoes, wrist watches, glasses, clothing etc. and comparing devices may be located into their homes. Compared to prior art detectors that detect only a vertical or a horizontal position of a human being, the system according to the invention allows to distinguish between a person sitting, bending over, lying, reaching etc. As a result, the processor and/or the interface will generate less fake alarms.

To control multimedia equipment, generating devices may be located into remote controls, wrist watches, headsets etc. and comparing devices may be located into the multimedia equipment and/or the headsets and possible sources may be located into the multimedia equipment. As a result, audio and/or video may be controlled in a more sophisticated way.

A mobile phone may be provided with the generating device and the comparing device to monitor its orientation and, in dependence of its orientation, to take action such as answering a call, going into a standby mode or an active mode etc. The reference signal for example originates from a source located in a house or a car or is for example supplied via a mobile network etc.

The sensor signal may comprise a first sensor signal representing a first orientation and/or a second sensor signal representing a second orientation and/or a third sensor signal representing a third orientation. The first and second and third orientations may be frame orientations such as X-axes and Y-axes and Z-axes or rolling and pitching and yawing or may be angle orientations without excluding other orientations. The sensor signal may comprise x-coordinates, y-coordinates and z-coordinates or may comprise rolling values, pitching values and yawing values or may comprise angle values etc. So, the system according to the invention and its one or more sensors are at least one-dimensional, preferably two- or three-dimensional. The sensor signal and the reference signal can be compared with each other directly, or indirectly, for example after being converted. The comparing may comprise analog comparisons and/or digital comparisons. The sensor signal and the reference signal may comprise analog signals and/or digital signals.

Figure 1:
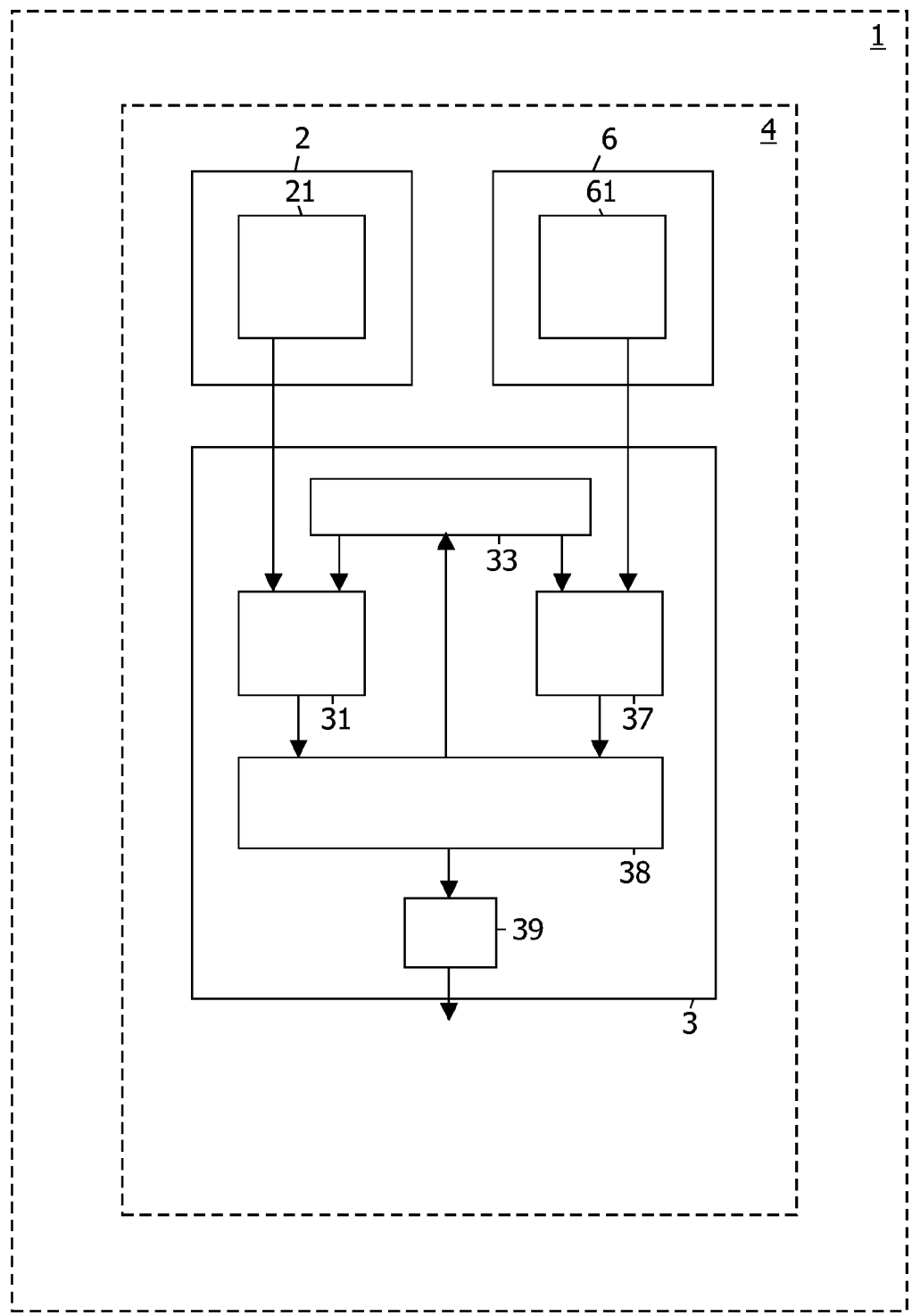
Figure 2:
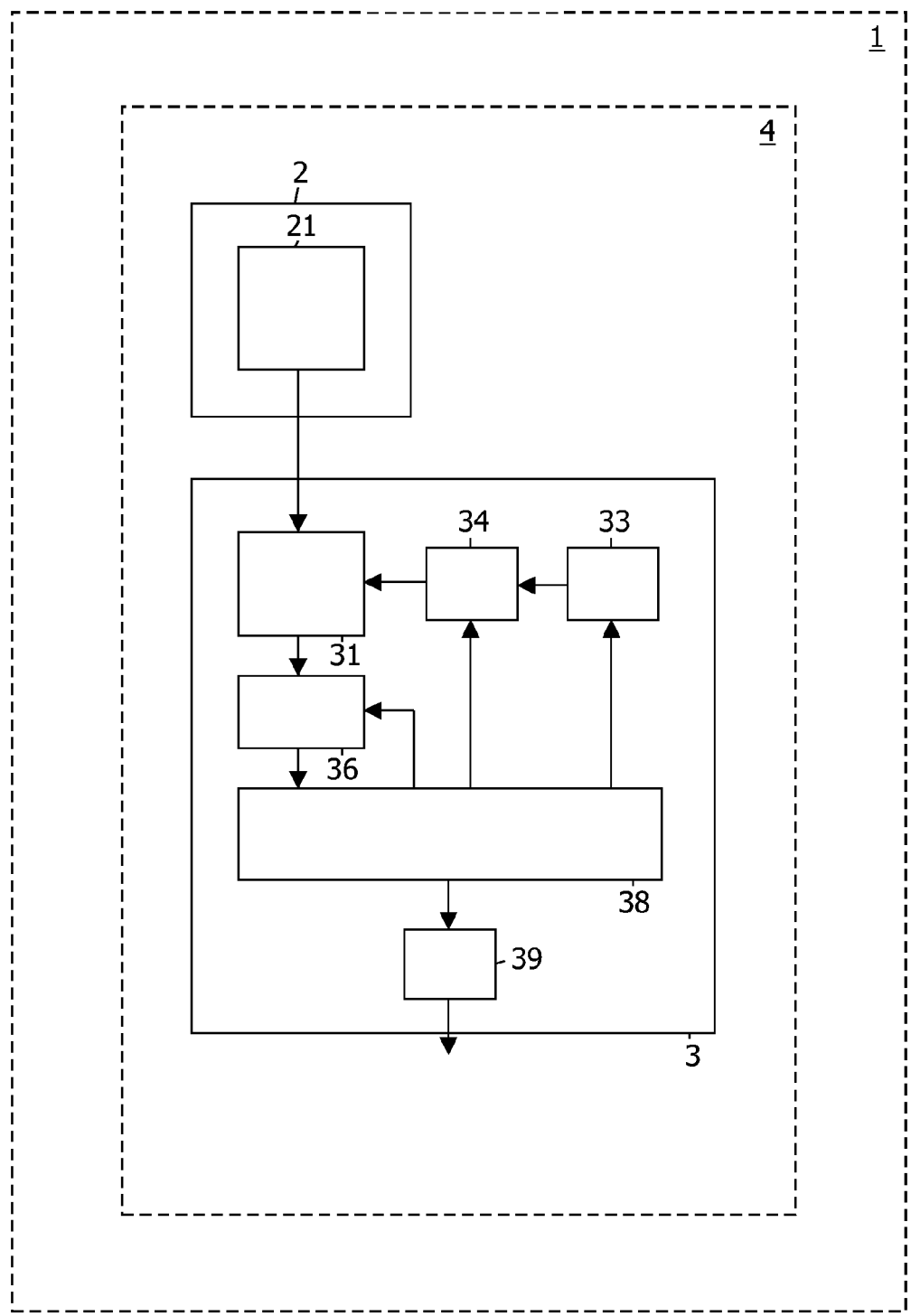
Figure 3:
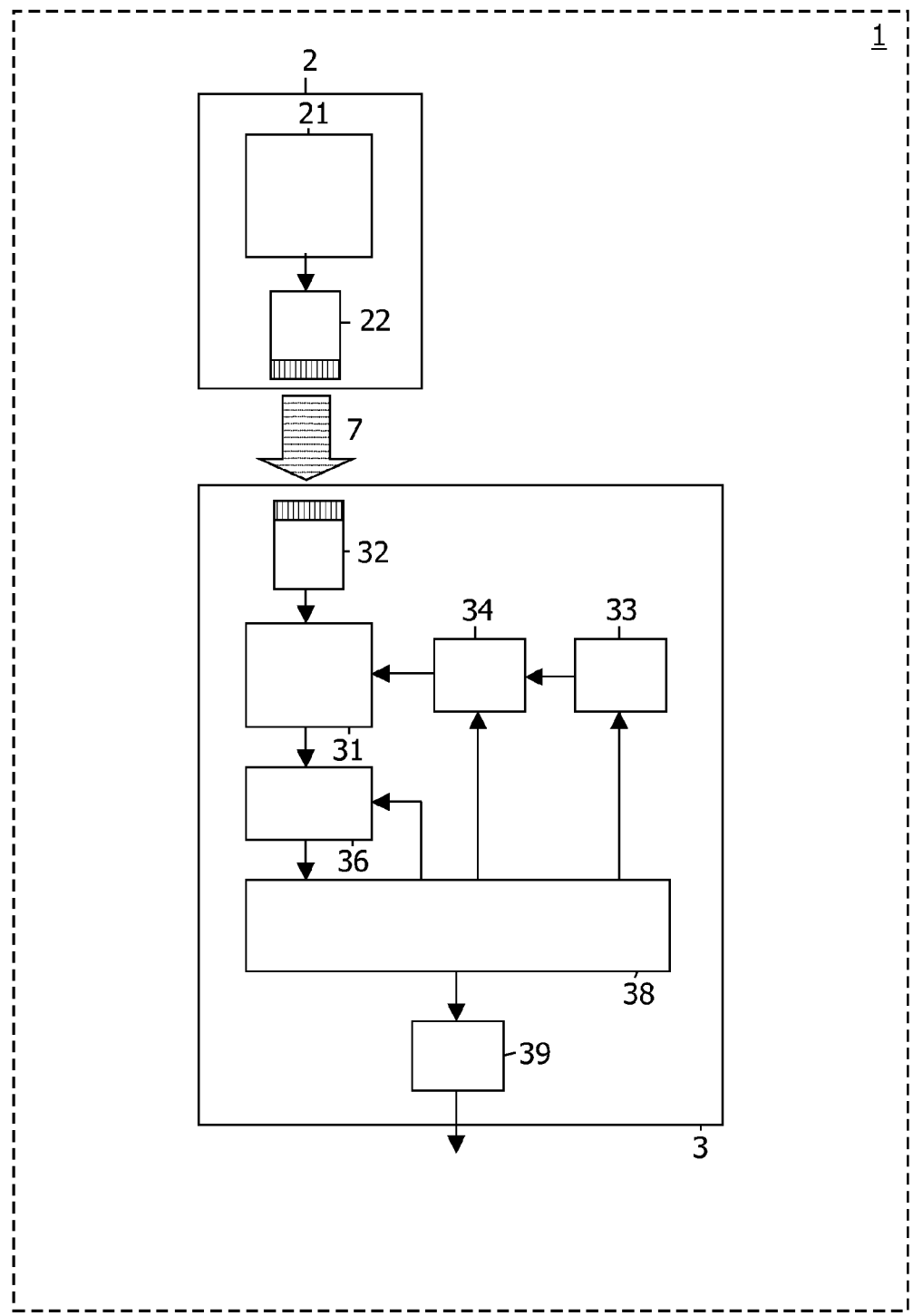
Figure 4:
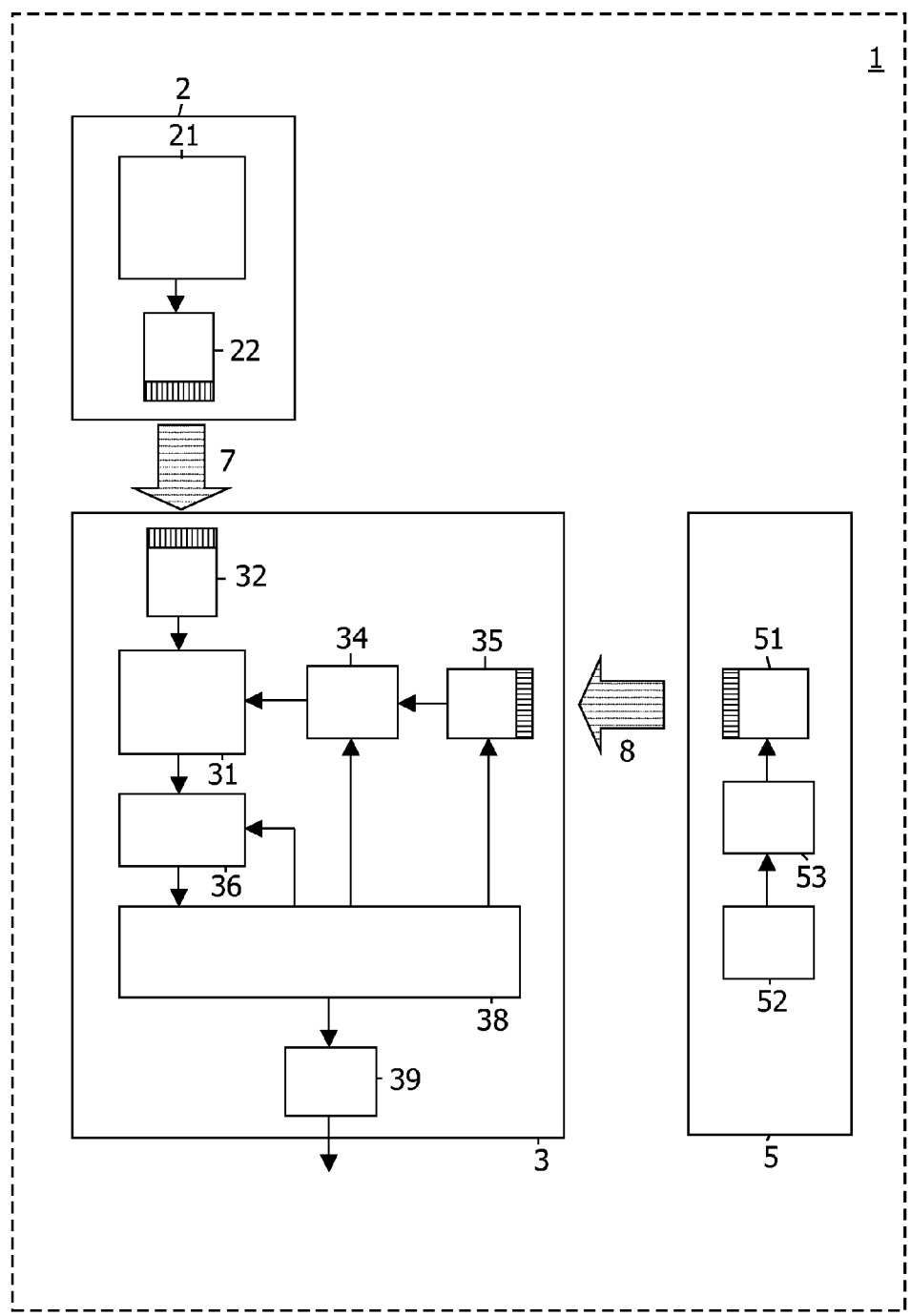
Figure 5:
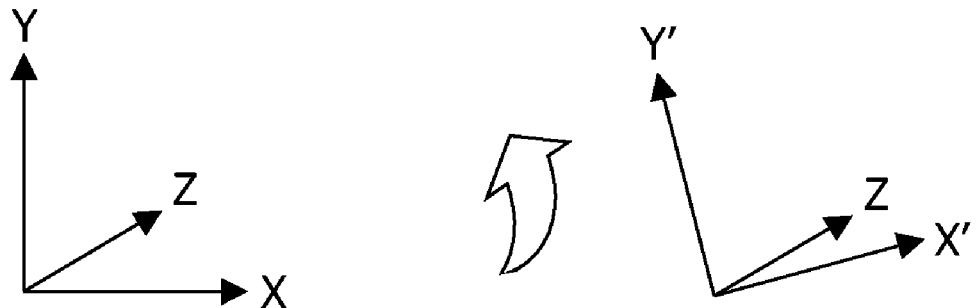
FIG. 5 shows a reference frame defined by a reference signal X,Y,Z and a rotated frame X',Y',Z defined by a sensor signal and a corresponding rotation made anti clockwise in the X,Y plane having the Z-axis as a rotation axis.
Figure 6:
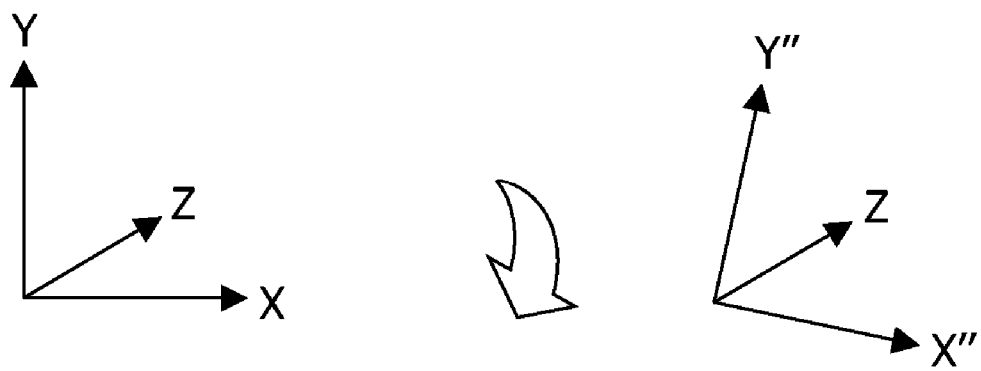
FIG. 6 shows a reference frame defined by a reference signal X,Y,Z and a rotated frame X'',Y'',Z defined by a sensor signal and a corresponding rotation made clockwise in the X,Y plane having the Z-axis as a rotation axis.

Generally, a three-dimensional angle is defined by three angles that define a rotational transformation matrix that would be required to align both frames. Such a rotational transformation matrix for example comprises a multiplication of three matrices as for example disclosed in US 2004/0172838.

Of course, many other frames and many other rotations in other planes and having other axes are possible, without departing from the scope of this invention. Other kinds of orientation sensors are not to be excluded. The generating device and/or the comparing device may be based on battery less transponder technology such that an incoming radio or infrared or other signal provides power for generating the sensor signal and/or for performing the interpreting. For example the reference signal originating from the source may play such a power providing signal. Alternatively, a non power providing activation signal may be supplied to the generating device and/or the comparing device for generating the sensor signal and/or for performing the interpreting. Further, the reference signal and/or the sensor signal and/or any other signal may be encoded to prevent that unauthorized use is made of this invention. In that case, an encoder may be used for encoding a signal leaving a device or a source and a decoder may be used for decoding an encoded signal entering a device etc.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the system claim enumerating several means, several of these means may be embodied by one and the same item of hardware. The mere fact that certain measures are recited in mutually different dependent claims does not indicate that a combination of these measures cannot be used to advantage.

The invention claimed is:

1. A system comprising:
a generating device comprising a sensor for generating a sensor signal representing an orientation of at least a part of the generating device, and
a comparing device comprising a comparator for comparing the sensor signal with a reference signal for interpreting the orientation;
the comparing device further comprising a reference sensor for generating the reference signal;
the generating device and the comparing device being parts of a car.

2. The system according to claim 1, the sensor signal comprising a first sensor signal representing a first orientation and/or a second sensor signal representing a second orientation and/or a third sensor signal representing a third orientation.

3. The system according to claim 1, the comparing device further comprising a reference memory for storing the reference signal.

4. The system according to claim 1, the comparing device further comprising a further receiver for receiving the reference signal from a source, which source comprises a further transmitter for transmitting the reference signal to the comparing device.

5. The system according to claim 4, the comparing device further comprising a reference memory for storing the reference signal.

6. The system according to claim 4, further comprising the source.

7. The system according to claim 6, the source comprising a reference sensor generating the reference signal.

8. The system according to claim 6, the source comprising a reference memory for storing the reference signal originating from a reference sensor.

9. The system according to claim 1, the comparing device further comprising a further comparator for comparing a comparison result originating from the comparator with a threshold value and for in response to a further comparison result generating a result signal.

10. The system according to claim 1, further comprising:
a further generating device comprising a further sensor for generating a further sensor signal representing a further orientation of at least a part of the further generating device, which further sensor signal is to be compared with a further reference signal for interpreting the further orientation.

11. A generating device for use in a system as defined in claim 1, the generating device comprising the sensor for generating the sensor signal representing the orientation of at least the part of the generating device.

12. A comparing device for use in a system as defined in claim 1, the comparing device comprising the comparator for comparing the sensor signal with the reference signal for interpreting the orientation.

13. A source for use in the system as defined in claim 1, the source comprising a further transmitter for transmitting the reference signal to the comparing device.

14. The system according to claim 1, wherein the reference sensor comprises a magnetic sensor.

15. The system according to claim 1, wherein the reference sensor comprises a tilt sensor.

16. A system comprising:
a generating device comprising a sensor for generating a sensor signal representing an orientation of at least a part of the generating device, and
a comparing device comprising a comparator for comparing the sensor signal with a reference signal for interpreting the orientation;
the comparing device further comprising a reference sensor for generating the reference signal, wherein the reference sensor comprises a magnetic sensor.

17. A system comprising:
a generating device comprising a sensor for generating a sensor signal representing an orientation of at least a part of the generating device, and
a comparing device comprising a comparator for comparing the sensor signal with a reference signal for interpreting the orientation;
the comparing device further comprising a reference sensor for generating the reference signal, wherein the reference sensor comprises a tilt sensor.

* * * * *